(12) United States Patent
Lewis et al.

(10) Patent No.: US 10,643,070 B1
(45) Date of Patent: May 5, 2020

(54) DISPLAYING CONTENT ON AN ELECTRONIC DISPLAY BASED ON AN ENVIRONMENT OF THE ELECTRONIC DISPLAY

(71) Applicant: Accenture Global Solutions Limited, Dublin (IE)

(72) Inventors: Edward Victor Ritchie Lewis, Toronto (CA); Michael English, Toronto (CA); Mathan Murugasen, Karnataka (IN); Viresh Veerasangappa Kadi, Bangalore (IN); Joshua David Rusak, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/405,820

(22) Filed: May 7, 2019

(51) Int. Cl.

| G06K 9/00 | (2006.01) |
| G09G 5/00 | (2006.01) |
| G06F 16/951 | (2019.01) |
| G06Q 30/02 | (2012.01) |
| G06Q 30/06 | (2012.01) |
| G05D 1/00 | (2006.01) |
| G06F 3/0488 | (2013.01) |
| G01C 21/32 | (2006.01) |
| G06F 3/0484 | (2013.01) |
| B60W 30/18 | (2012.01) |

(Continued)

(52) U.S. Cl.
CPC ....... *G06K 9/0063* (2013.01); *G06K 9/00785* (2013.01); *G09G 5/003* (2013.01); *B60W 30/18* (2013.01); *G01C 21/32* (2013.01);
*G05D 1/0088* (2013.01); *G06F 3/0482* (2013.01); *G06F 3/0484* (2013.01); *G06F 3/0488* (2013.01); *G06F 16/951* (2019.01); *G06Q 30/02* (2013.01); *G06Q 30/0269* (2013.01); *G06Q 30/06* (2013.01)

(58) Field of Classification Search
CPC .... G06F 16/951; G06F 3/0482; G06F 3/0484; G06F 3/0488; G06Q 30/02; G06Q 30/06; G06Q 30/0269; B60W 30/18; G05D 1/0088; G01C 21/32
See application file for complete search history.

(56) References Cited

U.S. PATENT DOCUMENTS

| 10,306,430 B1* | 5/2019 | Abari ................... G05D 1/0088 |
| 2017/0132922 A1* | 5/2017 | Gupta .................. G08G 1/0962 |

(Continued)

*Primary Examiner* — Quoc A Tran
(74) *Attorney, Agent, or Firm* — Harrity & Harrity, LLP

(57) ABSTRACT

A device may receive an image stream of an environment of an electronic display. The device may detect that a target is in the environment, wherein the target is detected based on the image stream including an image associated with the target. The device may identify that a first object is associated with the target, wherein the first object is identified based on the object recognition model being trained to recognize the first object. The device may determine a characteristic of the first object and may determine that a second object is in the environment. The device may generate content that is to be displayed via the electronic display, wherein the content is generated based on the characteristic of the first object and a characteristic of the second object. The device may cause the content to be displayed via the electronic display to permit the target to access the content.

20 Claims, 9 Drawing Sheets

(51) Int. Cl.
*G06F 3/0482* (2013.01)
*G06F 17/00* (2019.01)

(56) References Cited

U.S. PATENT DOCUMENTS

2018/0114251 A1* 4/2018 Zavesky ............ G06Q 30/0265
2019/0311404 A1* 10/2019 Wasserman ............ G08G 1/093

* cited by examiner

DISPLAYING CONTENT ON AN ELECTRONIC DISPLAY BASED ON AN ENVIRONMENT OF THE ELECTRONIC DISPLAY

BACKGROUND

An electronic display is an output (e.g., of a computing device) that enables presentation of content. An electronic display can present a message and/or information via content, such as images, text, video (e.g., an image stream or series of images), etc. The electronic display may convert data (e.g., image data, text data, video data, and/or the like) into the presented content in order provide the message and/or the information represented by the content. The electronic display may be positioned in various locations to permit targets to consume the information.

SUMMARY

According to some implementations, a method may include receiving, from an image capture device, an image stream of an environment of an electronic display; identifying, using a first object recognition model, that a first vehicle is in the environment, wherein the first vehicle is identified based on the image stream including an image of the first vehicle; identifying, using a second object recognition model, that a second vehicle is in the environment, wherein the second vehicle is identified based on the image stream including an image of the second vehicle; determining, based on a target detection model, that a target is in the environment, wherein the target is determined to be in the environment based on a characteristic of the second vehicle; determining a relationship between the first vehicle and the second vehicle, wherein the relationship is determined based on the first vehicle and the second vehicle having a common characteristic; selecting, using a content selection model, content that is to be presented via the electronic display, wherein the content is selected based on the characteristic of the second vehicle and the common characteristic; and causing the content to be displayed via the electronic display to permit a target to access the content.

According to some implementations, a device may include one or more memories, and one or more processors, communicatively coupled to the one or more memories, configured to: receive, from an image capture device, an image stream of an environment of an electronic display; identify, using an object recognition model, that a first object is in the environment, wherein the first object is identified based on the object recognition model being trained to determine that a representation of the first object is included in the image stream; identify, using the object recognition model, that a second object is in the environment, wherein the second object is identified based on the object recognition model being trained to determine that a representation of the second object is included in the image stream; determine that a target is associated with the second object; determine a relationship between the first object and the second object, wherein the relationship is determined based on the first object and the second object having a common characteristic; generate, based on the relationship, content that is to be presented via the electronic display, wherein the content is generated based on the common characteristic and a characteristic of the second object; and cause the content to be displayed via the electronic display to permit the target to access the content.

According to some implementations, a non-transitory computer-readable medium may store one or more instructions that, when executed by one or more processors of a device, may cause the one or more processors to: receive, from an image capture device, an image stream of an environment of an electronic display; detect, using a target detection model, that a target is in the environment, wherein the target is detected based on the image stream including an image associated with the target; identify, using an object recognition model, that a first object is associated with the target, wherein the first object is identified based on the object recognition model being trained to recognize the first object; determine a characteristic of the first object; determine, based on the characteristic of the first object, that a second object is in the environment; generate content that is to be displayed via the electronic display, wherein the content is generated based on the characteristic of the first object and a characteristic of the second object; and cause the content to be displayed via the electronic display to permit the target to access the content.

DETAILED DESCRIPTION

Figure 1A:
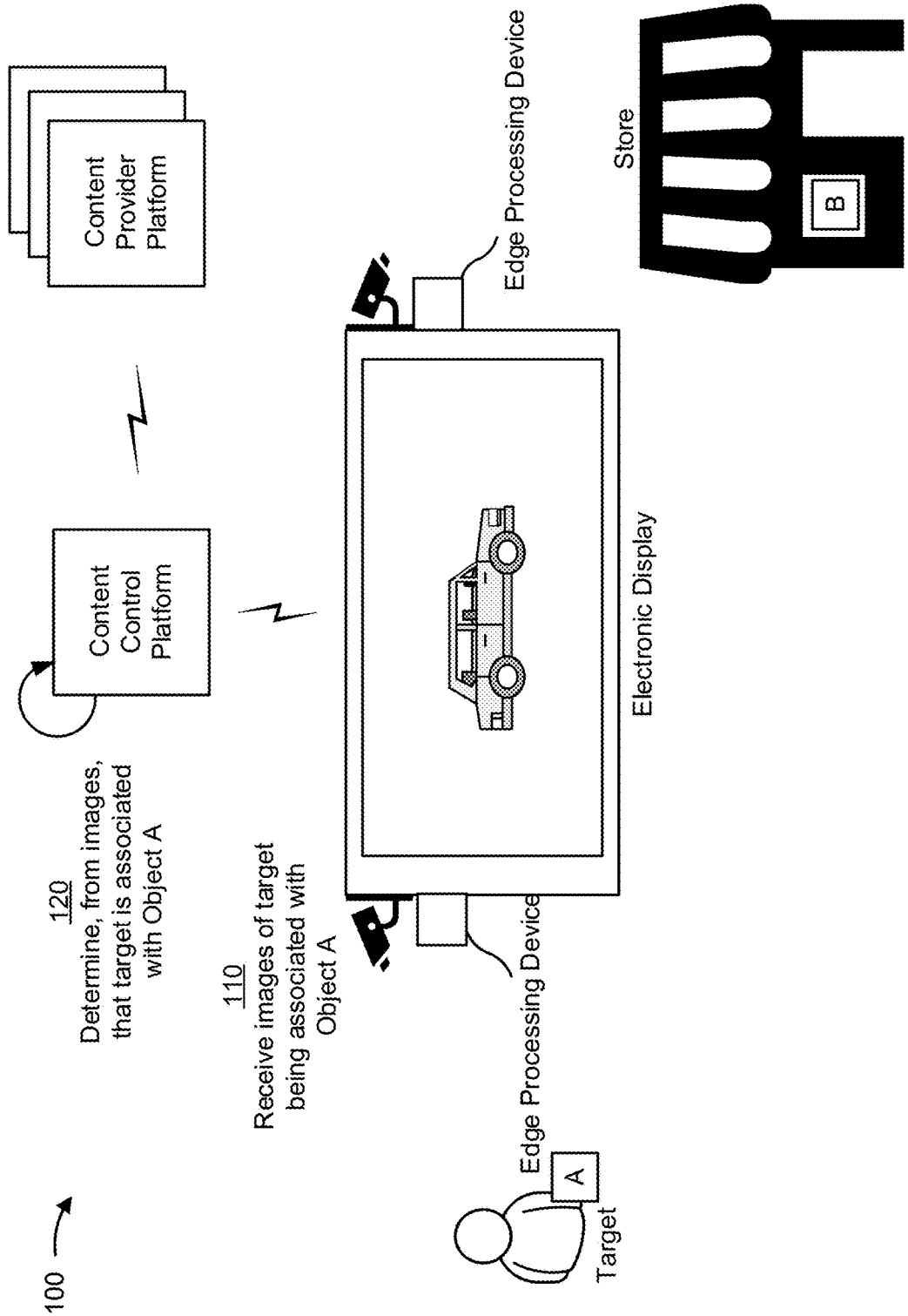
FIGS. 1A-1C are diagrams of one or more example implementations described herein.

The following detailed description of example implementations refers to the accompanying drawings. The same reference numbers in different drawings may identify the same or similar elements.

An electronic display enables content to be presented to permit one or more targets (e.g., individuals within view of the electronic display and/or within an environment of the display) to consume the content. The one or more targets may correspond to any individual that may be within view of the electronic display and/or one or more particular individuals (individuals that are presumed to have an interest in the content) that are within view of the electronic display. The content may include text, images, video, and/or the like that permits targets to access (e.g., view, read, consume, and/or the like) information represented by the content on the electronic display. Such information may include a message, advertising content, etc. For example, the electronic display may be an electronic sign (e.g., a traffic sign), an electronic billboard (e.g., a roadside billboard, a walkway billboard, an indoor billboard, and/or the like), etc.

In some instances, the electronic display may cycle through different content to relay different information to targets. Such content may be customized and/or updated to cycle through different content according to a schedule that dictates which content and/or when that content is to be presented via the electronic display. However, due to the scheduling, certain content that is to be displayed on the electronic display may not be consumed by one or more targets when the content is displayed. For example, the content may not be consumed because there were no targets in the area at the time the content was displayed. On the other hand, if some targets were in the area, the content may not have been consumed by any of those targets because those targets were not associated with the content, and, therefore, ignored the content of the electronic display (e.g., the targets had nothing in common with the content and/or had no interest in the content). Accordingly, resources (e.g., power resources, processing resources, memory resources, and/or the like) associated with storing, generating, providing, and/or presenting the content for display via the electronic display are wasted.

According to some implementations described herein, a content control platform enables content to be dynamically presented on an electronic display based on characteristics of an environment of the electronic display. The content control platform may identify the characteristics of the environment, select content based on the characteristics of the environment, and present the content via the electronic display. For example, the content control platform may receive one or more images (e.g., of an image stream) of the environment, analyze the one or more images to identify the characteristics, and present content according to the characteristics. As a specific example, the image capture device may capture an image of a commuter train and/or an image of an automobile traveling on a road. In such a case, the display system may present content via the electronic display that is associated with the train and/or the automobile. For example, the content may include an advertisement configured to target passengers and/or drivers of the automobiles to entice the passengers and/or drivers of the automobiles to consider using the train for transportation.

In this way, the content control platform may control timing of content such that optimal content (e.g., most appropriate content according to a model of the content control platform) for a particular environment is displayed at a particular time. In this way, computing resources may not be wasted on generating, processing, storing, and/or displaying content that cannot be consumed by one or more targets and/or content that is not likely to be consumed by one or more targets.

As described herein, one or more artificial intelligence techniques, including machine learning, deep learning, neural networks, and/or the like can be used to identify one or more characteristics of an environment of an electronic display, determine whether a target is in the environment of the electronic display, determine a relationship or association between one or more objects in the environment, determine the most appropriate content to be displayed by the electronic display, and/or the like. For example, the content control platform may use a computer vision technique, such as a convolutional neural network technique to assist in classifying image data (e.g., data relating representations of objects and/or targets) into a particular class. For example, the content control platform may determine that an object has a particular characteristic (e.g., is a particular type, is associated with a particular brand or entity, is a particular size, and/or the like) or that a target has a particular characteristic (e.g., male/female, tall/short, old/young, and/or the like). On the other hand, the content control platform may determine that an object does not have a particular characteristic and/or that a target does not have a particular characteristic. Furthermore, the content control platform may be configured to analyze image data to determine whether an object represented in the image data is associated with a target (or vice versa). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an edge detection technique, an object in motion technique (e.g., an optical flow framework and/or the like), and/or the like.

Figure 1B:
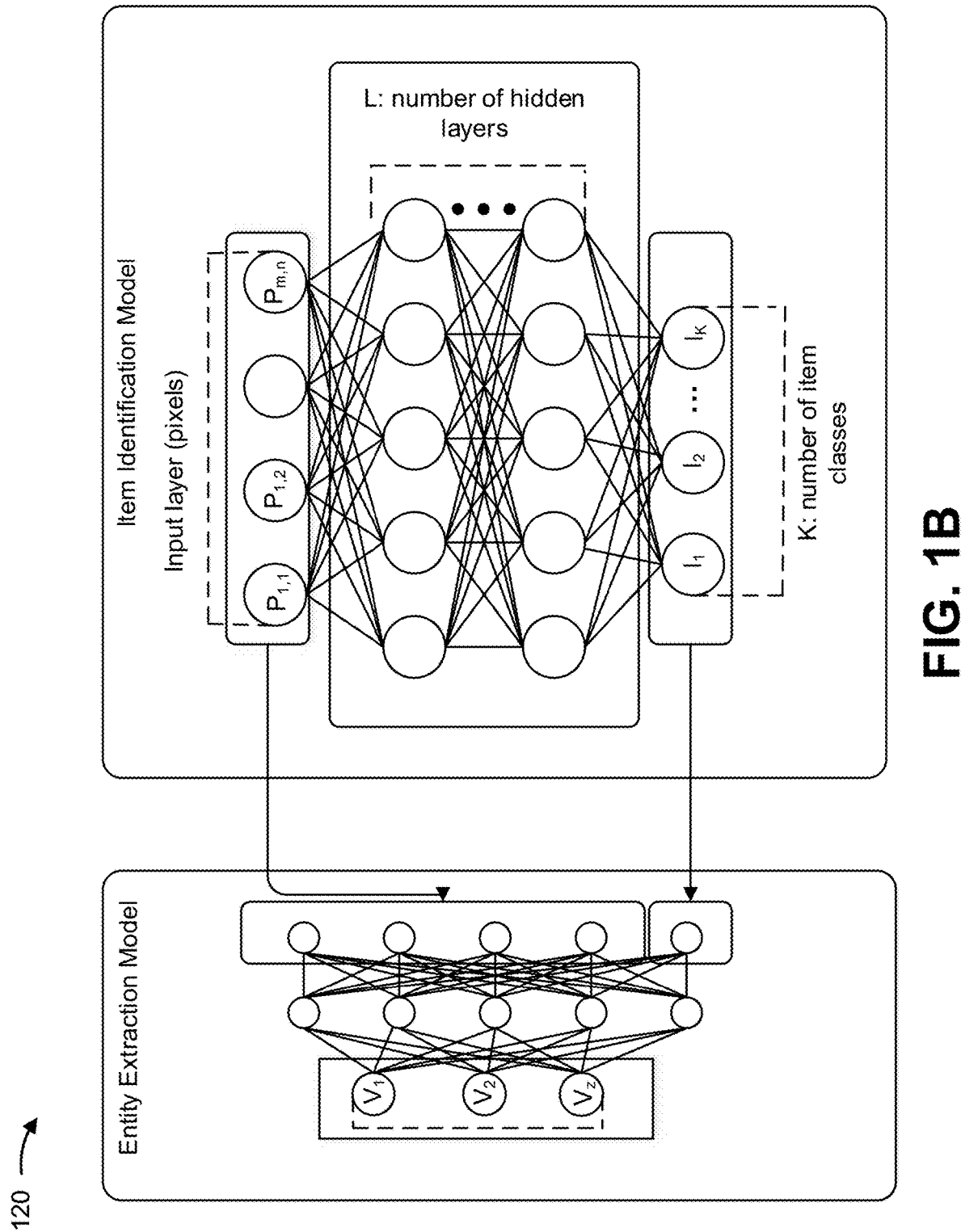
Figure 1C:
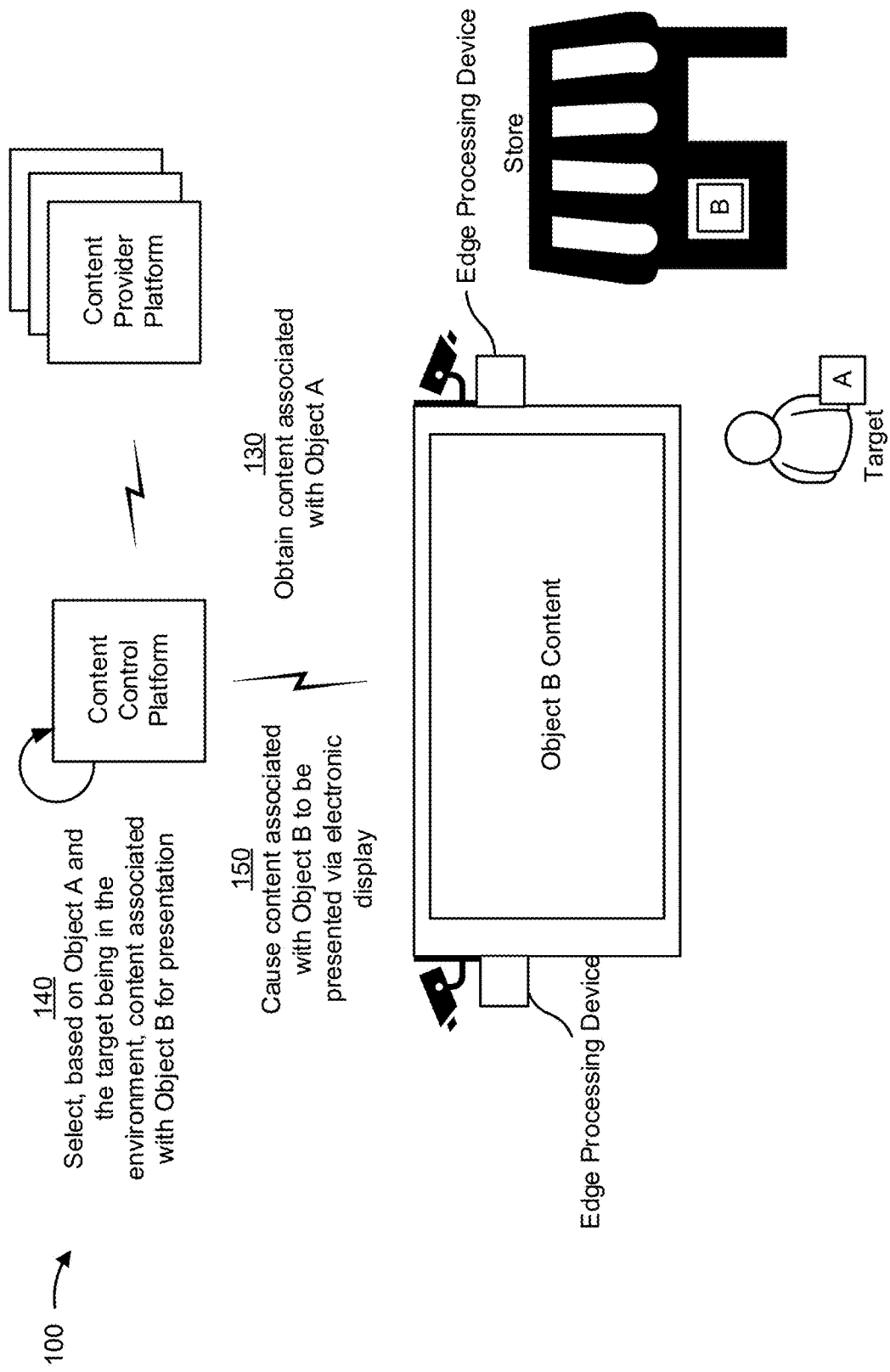

FIGS. 1A-1C are diagrams of an example implementation 100 described herein.

Example implementation 100 includes an electronic display, one or more image capture devices (referred to individually as an "image capture device" and collectively as "image capture devices"), one or more edge processing devices (referred to herein individually as "edge processing device" and collectively as "edge processing devices"), a content control platform, and one or more content provider platforms (referred to individually as an "content provider platform" and collectively as "content provider platforms"). Example implementation 100 further includes a target associated with a first object (shown by an "A" and referred to as "Object A") and a store associated with a second object (shown as a "B" in a "Store" and referred to as "Object B"). In some examples described below, Object A may be an object on the target's person and Object B may be any object associated with the Store. Further, Object A and Object B may be associated with one another (e.g., may be a same type of object, in a same category of objects, associated with a same owner/manufacturer, and/or the like).

The content control platform may be communicatively coupled with the edge processing devices, formed from and/or hosted by the edge processing devices, and/or the like. Additionally, or alternatively, the content control platform may be separate from (e.g., within a separate online platform, such as a separate cloud computing environment) and/or remotely located from the edge processing devices. Accordingly, the content control platform and/or one or more of the edge processing devices may identify (e.g., in one or more images from an image capture device) the target, the first object, and/or the second object, select content (e.g., received from a content provider platform) that is to be presented via the electronic display, and cause the electronic display to present the content to permit the target to access the content. Although some examples described in connection with FIGS. 1A-1C may refer to the content control platform performing one or more actions and/or operations, one or more of the edge devices may similarly perform the same and/or similar actions and/or operations. Additionally, or alternatively, in some implementations, the edge processing devices may be configured to implement the content control platform, as described herein.

As described herein, the electronic display may be any suitable electronic display. For example, the electronic display may include one or more of a liquid crystal display (LCD), a light emitting diode (LED) display, an organic LED (OLED) display, and/or the like. In some implementations, the electronic display may be an electronic billboard that is configured to present content (e.g., a message, advertising, and/or the like) to one or more targets in the environment of the electronic display, as described herein.

As shown in FIG. 1A, and by reference number 110, the content control platform receives one or more images of the target being associated with Object A. For example, the content control platform may receive the one or more images from the image capture devices, which are capturing images of an environment (e.g., an area, a location, and/or the like) of the electronic display. The image capture devices may include one or more cameras that provide the one or more images within an image stream (e.g., similar to a video surveillance camera, an internet protocol (IP) camera, and/or the like). The image stream may include image data that is provided to the content control platform (e.g., if the content control platform is co-located with the image capture devices and/or electronic display) and/or sent over one or more networks (e.g., a local area network (LAN), a wide area network (WAN), the Internet, and/or the like). The image stream may be analyzed immediately by the content control platform to identify and/or confirm key characteristics of Object A (e.g., in real-time or as image stream is received), rather than being saved (e.g., to a storage device) for later access or analysis. The one or more images of the image stream may be sequentially provided in time, rather than groups of the one or more images being provided at once or as one set of image data. According to some implementations, the one or more image capture devices may include one or more sensors (e.g., edge processing devices, motion sensors, infrared sensors, temperature sensors, radio frequency identification sensors, and/or the like) that are utilized to capture the images. For example, the image capture devices may detect motion in the environment (e.g., a target walking in the environment, an object (e.g., a vehicle) passing through the environment, and/or the like). In some implementations, the image stream may be analyzed by the edge processing devices to identify one or more characteristics of Object A prior to being sent to the content control platform (e.g., along with information identifying the one or more characteristics).

The image capture devices and/or edge processing devices may be co-located with the electronic display. For example, the image capture devices may be mounted to a support structure (e.g., a stationary support structure, such as a billboard support, a sign support, a wall mount, and/or the like) that is supporting the electronic display and/or may be embedded within a frame of the electronic display. Additionally, or alternatively, the edge processing devices may be configured to control the information presented by the electronic display. In some implementations, the image capture devices may be separately located from the electronic display and configured to capture images of an environment of the electronic display. The environment may include a viewing area of the electronic display (a location or space from which one or more targets may access the electronic display).

In this way, the content control platform may receive, from the image capture devices, one or more images of an environment of an electronic display to permit the content control platform to identify one or more objects and/or targets in the environment and present content associated with the one or more objects and/or target on the electronic display.

As further shown in FIG. 1A, and by reference number 120, the content control platform determines, from the one or more images, that a target is associated with Object A. In some implementations, the content control platform may identify Object A (e.g., using an object recognition analysis of the one or more images), and, based on identifying Object A, determine that the target is associated with Object A (e.g., based on a characteristic of Object A). For example, if the content control platform determines that Object A is a vehicle (e.g., a car, a truck, and/or the like), and the vehicle is moving, the content control platform may be configured to determine and/or detect that a target is in the vehicle (e.g., at least a driver). Additionally, or alternatively, the content control platform may identify the target (e.g. using a facial recognition analysis of the one or more images), and, based on identifying the target, determine that the target is associated with Object A (e.g., using an object recognition analysis of the target's person as shown in the one or more images).

Object A may be any object that can be identified and/or determined to be associated with a target according to the object recognition model. For example, Object A may be a vehicle, an article of clothing (e.g., a hat, a shirt, a jacket, and/or the like), and/or any other type of object that may be on the target's person and/or in use by the target. As described herein, the content control platform may use one or more computer vision techniques and/or one or more artificial intelligence techniques to identify objects in images received from the image capture devices.

In some implementations, as described herein, the content control platform may determine whether an object and/or target is or can be identified within one or more images of an environment, as described herein. For example, using information and/or images associated with a particular object, the content control platform may determine whether an image includes the particular object. In this case, the content control platform may generate and/or utilize a machine learning model, such as an object recognition model (e.g. a model that uses a computer vision technique, video analytics, and/or the like). For example, the content control platform may train the object recognition model using information and/or images that include a plurality of various objects, a plurality of various characteristics of various objects, and/or the like, to enable similar objects to be identified and/or detected within images. In some implementations, the content control platform may use a scoring system (e.g., with relatively high scores and/or relatively low scores) to identify and/or classify objects as being associated with one another. More specifically, the content control platform may determine that past characteristics of certain objects have a threshold probability of being associated with a particular object. In this case, the content control platform may determine that a relatively high score (e.g., as being likely to be identified) is to be assigned to those characteristics that are determined to be the same or similar as previously identified characteristics of the particular object (or more frequently identified than past identified characteristics). In contrast, the content control platform may determine that a relatively low score (e.g., as being unlikely to be identified) is to be assigned to characteristics of objects that are determined to be different than past identified characteristics of the particular object (or less frequently identified than past identified characteristics).

Similar to the object recognition model, a target detection model can be configured to identify and/or determine whether a target is in an environment based on one or more images of the environment. For example, the target detection model may be configured to detect a target in an image based on characteristics of targets (e.g., using facial recognition techniques, human recognition techniques, or gait recognition, and/or the like). Furthermore, the target recognition model may determine whether a target is in an environment based on identifying that an object is in an environment (e.g., an object identified by the object recognition model), and determining a likelihood of a target being associated with the object or likelihood that the object is not associated with the target. For example, an object that is frequently determined to be associated with a target may be given a relatively high score (e.g., as being likely to be associated with a target) and an object that is less frequently determined to be associated with a target may be given a relatively low score (e.g., as being less likely to be associated with a target). As a specific example, a vehicle may be determined to be associated with a target while a tree may be determined to not be associated with a target. Furthermore, a characteristic of the object may indicate that a target is likely associated with the object or that a target is likely not associated with the object. For example, a vehicle that is moving is more likely to be associated with a target (e.g., because, unless autonomous, the vehicle at least has a driver) than a vehicle that is not moving or parked (e.g., because the driver may have exited the vehicle).

As shown in FIG. 1B, an example image analysis model is illustrated. The image analysis model may be associated with the object recognition model and/or the target recognition model described herein. The image analysis model includes an item identification model and an entity extraction model. The image analysis model of FIG. 1B may be configured to detect, via the item identification model, items and classify, via the entity extraction model, the items as being and/or being associated with one or more entities (e.g., having a particular characteristic, being a particular type of item, and/or the like). As described in connection with FIG. 1B, an item may correspond to an object and/or a target.

As shown in the image analysis model of FIG. 1B, an input layer (which may correspond to an input (images) from the image capture devices) includes pixel values of an m×n pixel array ($P_{1,1}$ to $P_{m,n}$). The input values may correspond to an red-green-blue (RGB) value of the pixel that can be analyzed through a plurality of L layers. For example, a first layer may be an edge detection layer that is configured to detect edges between items (which can be based on differences in RGB values from pixel to pixel), a second layer may be a shape detection layer that is configured to identify shapes of the items from the detected edges, a third layer may be class detection layer that classifies the items, and so on. As shown, the image analysis model may be configured to classify (e.g., if possible) items I into K classes. For example, the K classes may include particular types of objects of a trained class as described herein (e.g., a train, an automobile, a food truck, and/or the like).

As further shown in the image analysis model of FIG. 1B, identified items I and the RGB pixel values of the input images may further be fed into the entity extraction model. The entity extraction model may be configured to identify whether the items are associated with one or more specific entities (e.g., by determining whether the item includes a unique identifier, a train identification number, a license plate number on an automobile, and/or the like). In this way, the entity extraction model, may indicate that the item is and/or is associated with a particular entity or a particular type of entity to permit context to be derived for content displayed by the content control platform, as described herein.

In some implementations, the item identification model and the entity extraction model may be co-located within a same device or platform (e.g., within a same edge detection device, within a same content control platform, and/or the like). Additionally, or alternatively, the item identification model may be on a separate platform or device from the entity extraction model. For example, the item identification model may be hosted by an edge processing device while the content control platform may host the entity extraction model (or vice versa).

In this way, the content control platform may determine, from the images, that a target in an environment of the electronic display is associated with an object, to permit the content control platform to determine content that is associated with the object and/or the target to be displayed.

As shown in FIG. 1C, and by reference number 130, the content control platform obtains content associated with Object A. In some implementations, the obtained content may be pre-stored in a data structure associated with the content control platform. For example, the content control platform may receive, from the content provider platforms, the content associated with Object A prior to receiving the images including Object A and/or determining that the target is associated with Object A. Additionally, or alternatively, the content control platform may request and/or receive the content from the content control platforms, in real-time, based on determining that the target is associated with Object A.

The content control platform may be associated with one or more content providers (e.g., entities, such as individuals or organizations, who are seeking to present content via the electronic display). For example, a content provider platform may include and/or be associated with a web-based platform of a content provider that provides, stores, and/or maintains content for display via the electronic display. In some implementations, the content providers may be customers of an entity associated with the content control platform and/or the electronic display. Accordingly, the entity may provide a service for the content providers that involves presenting content on the electronic display based on the characteristics of the environment. More specifically, such a service may involve generating and/or presenting content that is determined to be associated with one or more targets in the environment.

In some implementations, the content control platform may receive, from the content provider platforms, images of objects that the content provider platforms have instructed the content control platform to identify. In such cases, the content control platform may use the images as training data for the object recognition model and/or target detection model. Additionally, or alternatively, the content control platform may parse natural language descriptions of objects, received from the content provider platforms, that can be used to identify corresponding objects in images of the environment. For example, the content control platform may obtain, from a content provider platform, data identifying, in natural language, a description of a particular object, logo, brand, and/or the like, and may parse the data to identify characteristics of the object, logo, brand, and/or the like. Such objects and/or descriptions of the objects may be associated with the content provider platforms in that entities (e.g., the content providers, clients of the content providers, representatives of the content providers, and/or the like) associated with the content provider platforms may produce, manufacture, own, sell, and/or operate similar objects (e.g., objects of a same type or category) as the identified objects. Accordingly, by providing such content to the content control platform, the content provider platforms may permit the content control platform to present content that is associated with an object that is within the environment and that is known to be associated with the target (e.g., to provide additional exposure to related content associated with the object).

In some implementations, the content control platform may identify one or more particular characteristics of the object to permit the content control platform to determine specific content that may be associated with the object. For example, the content control platform may analyze an object in an image to identify recognizable identification information associated with the object. For example, the content control platform may be configured to identify, within the image, a name, a number, a make, a model, brand, and/or the like that is indicated on the object and/or in association with the object.

As a specific example, in FIG. 1A, Object A may be a purse carried by the target (or on the target's person), and the content control platform may be configured to identify a logo on the purse that indicates a brand (e.g., Brand A) associated with the purse. The content control platform may use a mapping of the logo (and/or information associated with the logo, such as a brand name, a content provider name, and/or the like) to a particular content provider platform that is to provide content associated with the object. Accordingly, using the mapping, the content control platform may obtain content from the content provider platform (which may store the content and/or provide the content to the content control platform on demand). For example, the content control platform may use an application programming interface (API) call to the content provider platform to obtain the content from the content provider platform. Such content may be up-to-date content (e.g., up-to-date statistics, up-to-date news, up-to-date statuses, and/or the like) that is to be presented when the object is detected. Accordingly, referring to the example above, the content may include text and/or images of recent sales associated with Brand A, a recent story associated with Brand A, a stock associated with Brand A, and/or the like.

In some implementations, the content control platform may notify the content provider platform that the object is in the environment, to permit the content control platform to determine whether to provide content that is to be presented via the electronic display. Upon receipt of the content, if provided, the content control platform may designate the content as content that is to be presented via the electronic display while Object A is in the environment of the electronic display. Additionally, or alternatively, the content control platform may use a mapping of the logo of the purse to particular content that is to be presented when the logo is identified in an image of the environment. For example, a content provider platform associated with Brand B may have provided content to content control platform that is to be displayed when a logo on Object A is detected in the environment of the electronic display. Based on identifying the logo, the content control platform may determine that certain content associated with Brand B is to be presented via the electronic display (e.g., "Hey you in the Brand A purse, you can get a Brand B purse at the Store").

Additionally, or alternatively, if such specific characteristics cannot be identified, the content control platform may be configured to utilize relatively more generic types of characteristics associated with the object to obtain content associated with the object. For example, referring to the above example, the content control platform may determine that the purse is blue and/or that the purse is a particular size. In such cases, the content provider platform may determine that such content is to allude to the blue purse and/or size of the blue purse (e.g., "Hey you in the blue shirt, you can find large purses at the Store").

In some implementations, the content control platform may detect that a plurality of objects (e.g., Object A and Object B) are simultaneously in the environment of the electronic display. For example, the content control platform may receive, from an image capture device, an image of Object B and/or the store associated with Object B (e.g., by identifying a logo of the store, by identifying the object near the store, and/or the like). In some implementations, to obtain content associated with the one or more objects, the content control platform may maintain a list (e.g., a running list and/or a current list) of objects identified in images of the environment of the electronic display. The content control platform may analyze (e.g., using a machine learning model) the list of objects in the environment to permit the content control platform to identify relationships between at least two of the objects. Accordingly, when a target is determined to be associated with one of the objects, the content control platform may obtain content associated with that object and present content associated with that object and/or any of the other objects in the environment that are determined to have a relationship with that object. The content control platform may determine that objects in an environment are related based on having one or more common characteristics. For example, a mapping of information identifying characteristics of the objects (e.g., type, category, brand, location, and/or the like) may be maintained in association with the objects. Using such information, the content control platform may determine that the environment includes two related objects and present content that is associated with both objects (e.g., in order to attract the attention of a target that is associated with at least one of the objects). Accordingly, based on the identified relationships between at least two objects in the environment, the content control platform may obtain content (e.g., from a data structure associated with the content control platform and/or from one or more of the content control platforms).

In this way, the content control platform may obtain content that is to be presented via the electronic display based on characteristics of the environment (e.g., which objects and/or targets are in the environment).

As further shown in FIG. 1C, and by reference number 140, the content control platform selects, based on Object A and the target being in the environment, content associated with Object B for presentation via the electronic display. As described herein, the content control platform determines that Object A, Object B, and the target are in the environment of the electronic display. Based on characteristics of Object A, characteristics of Object B, and/or one or more characteristics of the target, the content control platform may select content that is to be displayed. For example, the content control platform may identify a relationship between Object A and Object B.

In some implementations, the content control platform may generate content based on information and/or content received from the content provider platform and/or based one or more characteristics of Object A and/or Object B. For example, the content control platform may use a content template that is to be used to generate content specific to the characteristics of Object A. Referring to the example above, the content control platform may receive and/or maintain a content template (e.g., from a content provider platform associated with Brand B) that states "Hey you with the purse, you can get a Brand B purse at the Store." Based on the content control platform determining that the target is associated with Object A (the purse) and that Object A includes a Brand A logo, content control platform may generate the content by inserting "Brand A" into the field of the content template. In some implementations, the content control platform may select and/or generate content associated with Object A only and/or content associated with a combination of Object A and Object B (e.g., based on the content and/or information received from the content provider platforms).

In some implementations, the content control platform may be configured to obtain and/or present content associated with the content provider platforms based on a subscription status associated with the content provider platforms. For example, one or more service level agreements (SLAs) associated with displaying content from the content provider platforms may be used to prioritize which content is to be displayed based on characteristics of the environment (e.g., characteristics of objects, characteristics of targets, timing (e.g., time of day, time of week, time of year, and/or the like), location of the environment, and/or the like). Accordingly, if a first content control platform provides content associated with a first object and a second content control platform provides content associated with a second object, and both objects are determined to be in the environment, the content control platform may use the subscription statuses of the first content control platform and the second content control platform to determine which content is to be displayed via the electronic display.

In some implementations, the content control platform may use a machine learning model, such as a content selection model, to select and/or generate content for display via the electronic display. For example, content control platform may train the content selection model based on one or more content selection parameters associated with selecting and/or generating content for display based on the environment of the electronic display, such as one or more characteristics of one or more objects in the environment, one or more characteristics of one or more targets in the environment, location information associated with the environment, timing associated with the environment, content display agreements with one or more content providers associated with the content provider platforms (e.g., which may be used to prioritize content that is to be displayed according to which objects are in an environment), and/or the like. The content provider platform may train the content selection model using historical data associated with selecting and/or generating content according to the one or more content selection parameters. Using the historical data and the one or more content selection parameters associated with one or more objects in images of the environment as inputs to content selection model, the content provider platform may select and/or generate content that is to be displayed via the electronic display to permit the target to consume content that is associated with the target.

In this way, the content control platform may select and/or generate content that is associated with one or more objects and/or one or more targets in an environment to permit the content to be displayed via the electronic display and permit the one or more targets to access and/or consume the content.

As further shown in FIG. 1C, and by reference number 150, the content control platform causes content associated with Object B to be presented via the electronic display. For example, the content control platform may provide display data associated with the selected and/or generated content to the electronic display that causes the electronic display to render the content on the electronic display. For example, Object B content that is presented on the electronic display may include a call to action, specifically directed at the target (e.g., "Hey you with the Brand A purse"), and/or advertising associated with Object B (e.g., "you can get a Brand B purse from the Store").

In this way, the content control platform may cause content, specific to one or more particular characteristics of one or more objects and/or one or more targets in an environment, to be presented via an electronic display to permit the one or more targets to access the content and/or to increase the likelihood that the one or more targets consume the content.

In this way, as described herein, the content control platform may control timing associated with which content is to be presented and/or if any content is to be presented via an electronic display based on characteristics of an environment of the electronic display. Accordingly, if the content control platform determines that there are no targets in the environment of the electronic display, the content control platform may determine that no content is to be presented via the electronic display (and/or cause the electronic display to shut down or enter a low-power mode) to avoid wasting resources associated with presenting content on an electronic display that would not be consumed by any targets. Furthermore, as described herein, the content control platform may select content and/or generate content that is associated with one or more targets in the environment (e.g., content that is personal to the one or more targets). In this way, the content control platform may improve the likelihood that the content is consumed by the one or more targets, due to the content being personalized and/or associated with the target (e.g., by addressing the one or more targets and/or an object associated with the one or more targets).

According to some implementations, the content control platform may cause the content to be displayed while the one or more targets are in the environment of the electronic display. For example, the content control platform may cause the electronic display to be activated based on detecting (e.g., using images from the image capture devices, using sensors, and/or the like) that a target is in the environment of the electronic display. Based on detecting the target, the content control platform may cause the content to be presented via the electronic display, as described herein. Additionally, or alternatively, after an identified target is no longer in the environment of the electronic display, the content control platform may cause the electronic display to no longer present the content, present different content (e.g., content associated with a different object in the environment), enter a low-power mode (e.g., a sleep mode or hibernation mode), and/or shut down. In some implementations, if the content control platform determines that no targets are in the environment of the electronic display (e.g., due to lack of movement as determined from images captured by the image capture devices and/or from measurement signals from sensors), the content control platform may cause the electronic display to enter the low-power mode and/or shut down until a target is detected in the environment.

As indicated above, FIGS. 1A-1C are provided merely as one or more examples. Other examples may differ from what is described with regard to FIGS. 1A-1C.

Figure 2:
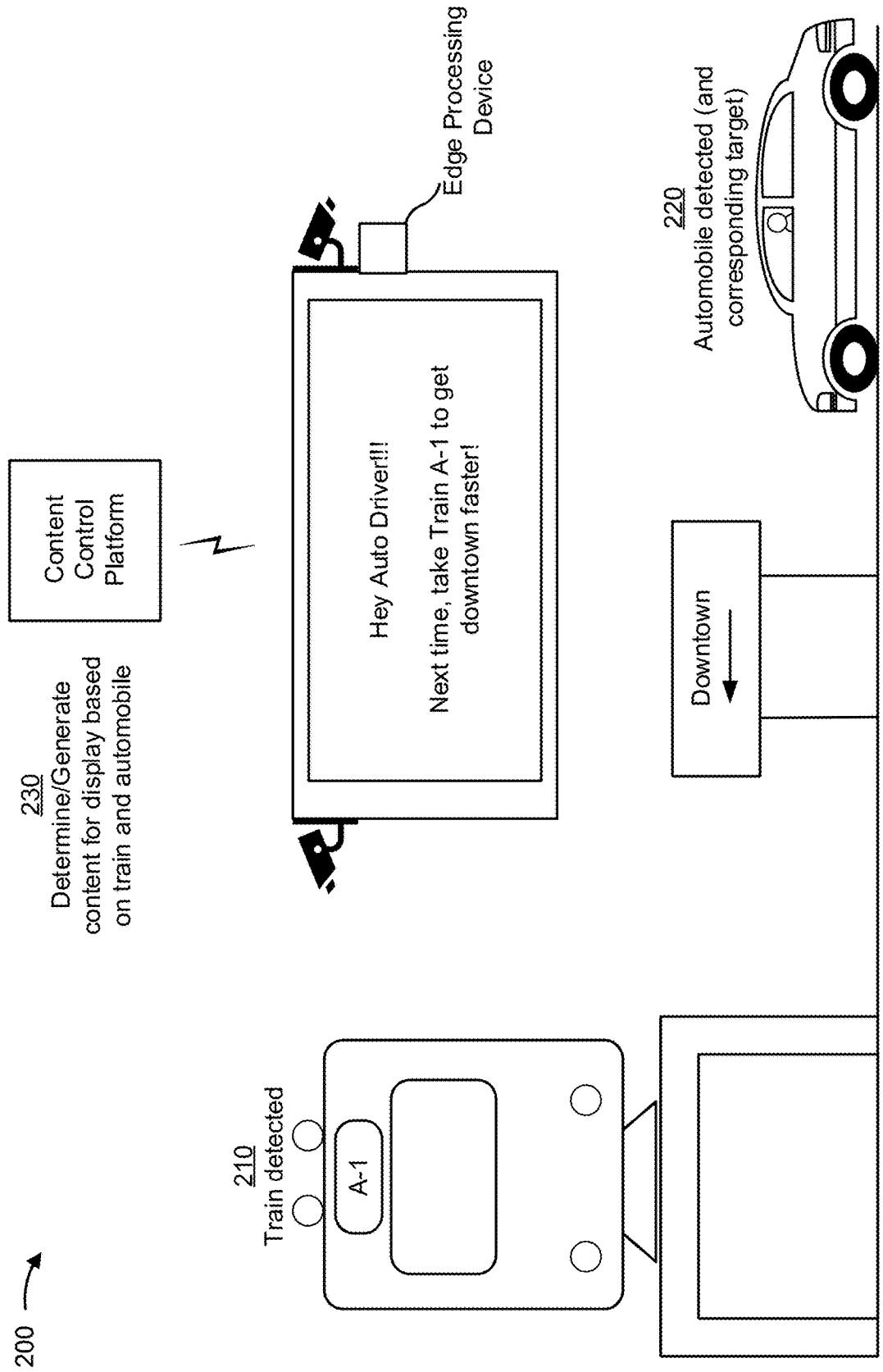
FIG. 2 is a diagram of an example implementation described herein.

FIG. 2 is a diagram of an example implementation 200 described herein. Example implementation 200 includes an edge processing device, a content control platform, an electronic display, one or more image capture devices, a first vehicle, shown as train A-1, a second vehicle, shown as an automobile, and a target associated with the vehicle. In the example of FIG. 2, train A-1 is on tracks that are heading toward a downtown area (as shown by a downtown) and the automobile is on a road heading toward downtown.

As shown in FIG. 2, and by reference number 210, the content control platform may detect a train, as described herein. For example, the edge processing device and content control platform, using images from one more image capture devices (and/or one or more sensors configured to detect train A-1), may identify that train A-1 is in the environment of the electronic display. The edge processing device and content control platform may use an object recognition model that is configured to detect the train (e.g., trained to detect the presence of a train, trained to identify the train, trained to determine characteristics of the train, and/or the like).

As further shown in FIG. 2, and by reference number 220, the edge processing device may detect that an automobile is in the environment of the electronic display. For example, the edge processing device may use an object recognition model that is configured to detect the automobile (or any type of vehicle/conveyance). In some implementations, the edge processing device may determine a characteristic of the automobile. For example, the edge processing device may determine that the automobile is moving. Accordingly, based on the fact that the automobile is moving, the edge processing device may determine that a target is present in the environment. Furthermore, the edge processing device may determine that the automobile is traveling in a same direction as the train (e.g., both toward downtown).

In some implementations, the edge processing device may use one or more mapping tables to identify and/or classify objects and/or targets as described herein (e.g., using the image analysis model of FIG. 1B). For example, the edge processing device may use the following object classification lookup table to map identified objects and/or targets:

TABLE 1

| Object ID | Object Class |
|---|---|
| Obj1 | X-Train |
| Obj2 | X-Bus |
| Obj3 | Object Type A |
| Obj4 | Object Type B | where the objects are classified with object classes. Furthermore, the edge processing device may use the following target classification lookup to classify targets associated with particular objects:

TABLE 2

| Target ID | Target Class |
|---|---|
| T0 | To Any |
| T1 | To Automobile | wherein the targets are classified with particular target classes to which certain content is to be targeted. In this way, the edge processing device may use the target classification lookup table and/or the object classification lookup table to indicate to the content control platform the classes of objects and/or targets that are in the environment of the electronic display. In some implementations, the lookup tables may be maintained by the content control platform and the edge processing device may update and/or provide information to update the lookup tables.

As further shown in FIG. 2, and by reference number 230, the content control platform may determine and/or generate content for display based on the train and the automobile.

In some implementations, the content control platform and/or the edge processing device may use the object classification table to determine whether the environment of the electronic display is to be analyzed for a particular target. For example, the edge processing device may be configured to detect whether an automobile is in the environment of the electronic display based on the detecting the train in the environment. Accordingly, once the train is detected, the edge processing device may analyze images to determine whether an automobile is in the environment, and if the automobile is moving in a direction associated with a direction in which the train is traveling (e.g., based on different images showing the automobile in different locations in the environment), that content associated with the train is to be presented. For example, as shown, the content may present content to draw attention of the target (e.g., "Hey Auto Driver!!!") and indicate and/or imply that the train is going to reach downtown faster than the target (e.g., "Next time, take Train A-1 to get downtown fasted").

In some implementations, content control platform may access a content provider platform associated with train A-1 (e.g., a content provider platform associated with an entity that owns or operates train A-1) to obtain information associated with train A-1 (e.g., schedule information, destination information, and/or the like). For example, when the edge processing device and content control platform determines that train A-1 is in the environment, the content control platform may send an application programming interface (API) call to the content provider platform to obtain schedule information associated with train A-1. Accordingly, the content control platform may present content that is more specific ("Train A-1 will be downtown at 9:00 am," and/or the like) based on the content control platform being configured to obtain such specific information associated with train A-1 from the content provider platform. Additionally, or alternatively, the content control platform may be configured to present more specific content associated with the automobile (e.g., "Hey driver of the blue car," "Hey driver of Brand X automobile," and/or the like) based on the edge processing device being configured to identify such specific information associated with the automobile.

The content control platform may use the following context relationship lookup table to identify which content is to be displayed by the electronic display based on whether the object can be associated with a particular entity:

TABLE 3

| Target ID | Object ID | Entity Status | Message |
|---|---|---|---|
| T0 | Obj1 | 0 | "Hi!!! Use the Train" |
| T1 | Obj1 | 1 | "Hi!!!! Use Train A-1" | where the entity status indicates whether a specific identity has been identified (e.g., depending on a probability score indicating whether the target is associated with a particular entity). The entity status may be used to determine which message is to be displayed (a "to any" message or a "to automobile message" corresponding to the target identifier). For example, the edge processing device and/or content control platform may use the entity extraction model of FIG. 1B to determine whether an entity value indicates a likelihood that the particular entity is in the environment of the electronic display. Accordingly, because a value for the entity associated with a target identifier T0 may be below a threshold, the entity status may be set to '0,' and the value for the entity associated with target identifier T1 may be at or above the threshold, and thus may be set to '1.' Accordingly, the content control platform may select, using the context relationship lookup table, message content for presentation via the electronic display based on the identified targets and/or entities associated with objects identified in the environment of the electronic display.

Accordingly, the edge processing device and/or content control platform may be configured to analyze images of an environment of an electronic display to detect different types of vehicles (e.g., vehicles that provide different forms of transportation), and based on detecting a target in the environment, present content associated with one of the types of vehicles to permit the target to consume the content and/or receive information associated with the type of vehicle (e.g., that train A-1 is faster than the automobile).

As indicated above, FIG. 2 is provided merely as one or more examples. Other examples may differ from what is described with regard to FIG. 2.

Figure 3:
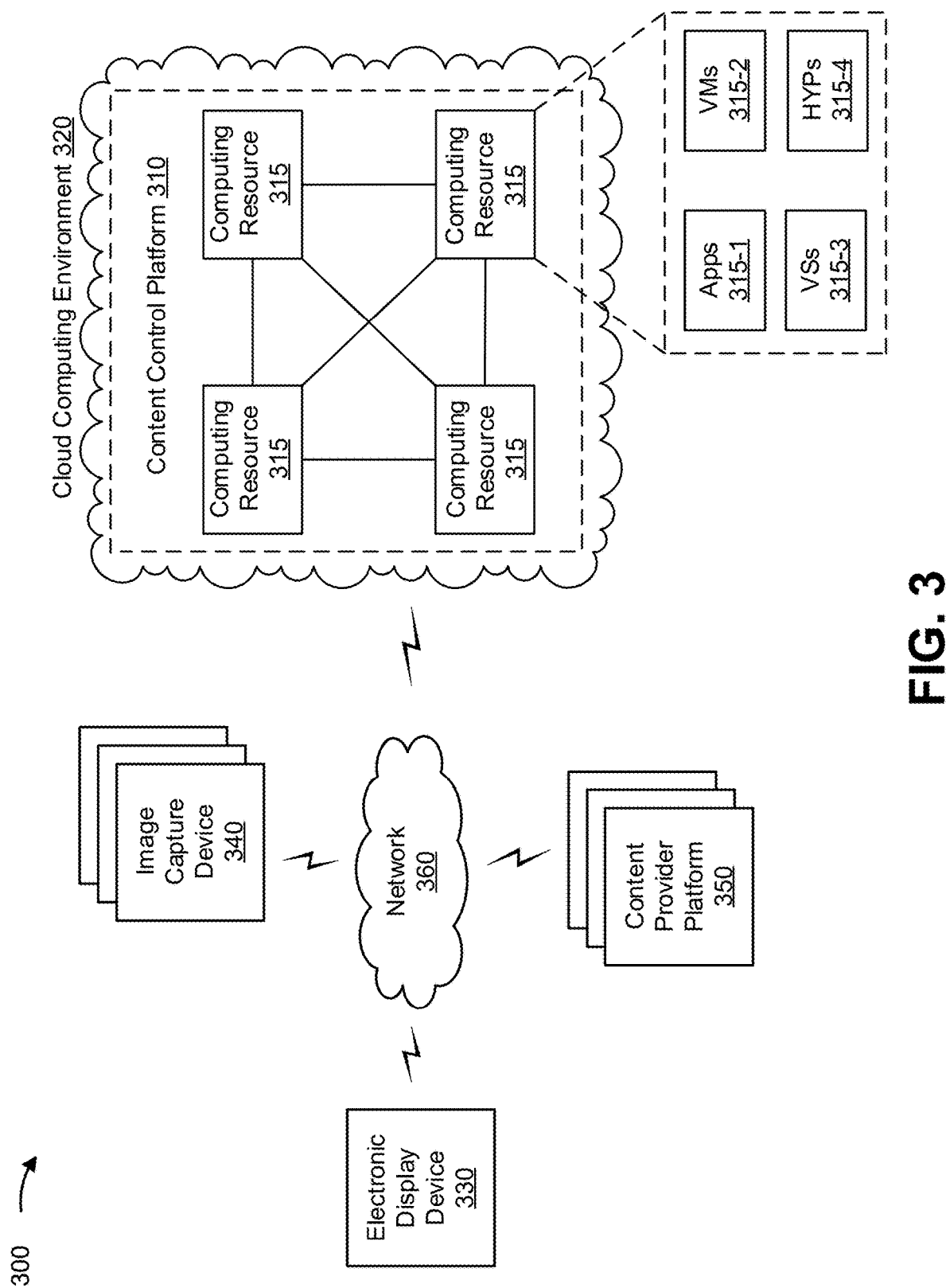
FIG. 3 is a diagram of an example environment in which systems and/or methods described herein may be implemented.

FIG. 3 is a diagram of an example computing and/or network environment 300 (referred to herein as "environment 300") in which systems and/or methods described herein may be implemented. As shown in FIG. 3, environment 300 may include an edge processing device (insert number) and content control platform 310, a computing resource 315, a cloud computing environment 320, an electronic display device 330, one or more image capture devices 340 (referred to herein individually as image capture device 340 or collectively as image capture devices 340), one or more content provider platforms 350 (referred to herein individually as content provider platform 350, or collectively as content provider platforms 350), and a network 360. Devices of environment 300 may interconnect via wired connections, wireless connections, or a combination of wired and wireless connections.

Content control platform 310 includes one or more computing resources assigned to determine content that is to be presented by electronic display device 330 and/or to instruct electronic display device 330 to present the content, as described herein. For example, content control platform 310 may be a platform implemented by cloud computing environment 320 that may determine characteristics of an environment (e.g., a physical and/or visible environment) of electronic display device 330 (e.g., based on images from image capture device 340, based on information from one or more sensors of an environment, and/or the like), select content that is to be displayed by electronic display device 330 based on the characteristics, and cause electronic display device 330 to present the content. In some implementations, content control platform 310 is implemented by computing resources 315 of cloud computing environment 320.

Content control platform 310 may include a server device or a group of server devices. In some implementations, content control platform 310 may be hosted in cloud computing environment 320. Notably, while implementations described herein describe content control platform 310 as being hosted in cloud computing environment 320, in some implementations, content control platform 310 may be non-cloud-based or may be partially cloud-based.

Cloud computing environment 320 includes an environment that delivers computing as a service, whereby shared resources, services, etc. may be provided to electronic display device 330. Cloud computing environment 320 may provide computation, software, data access, storage, and/or other services that do not require end-user knowledge of a physical location and configuration of a system and/or a device that delivers the services. As shown, cloud computing environment 320 may include content control platform 310 and computing resource 315.

Computing resource 315 includes one or more edge processing devices (e.g., the edge processing devices of example implementation 100 and/or example implementation 200), personal computers, workstation computers, server devices, or another type of computation and/or communication device. In some implementations, computing resource 315 may host content control platform 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by electronic display device 330. Application 315-1 may eliminate a need to install and execute the software applications on electronic display device 330. For example, application 315-1 may include software associated with content control platform 310 and/or any other software capable of being provided via cloud computing environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program and may support a single process. In some implementations, virtual machine 315-2 may execute on behalf of a user (e.g., electronic display device 330), and may manage infrastructure of cloud computing environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems and may manage the execution of the guest operating systems. Multiple instances of a variety of operating systems may share virtualized hardware resources.

Electronic display device 330 includes one or more devices that include an electronic display. Furthermore, electronic display device 330 may include one or more devices capable of receiving, generating, processing, providing, and/or displaying content via an electronic display. For example, electronic display device 330 may include one or more of an electronic billboard, a television, a monitor, and/or the like. Additionally, or alternatively, electronic display device 330 may include a computing device that includes an integrated display device (e.g., a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Image capture device 340 includes one or more devices capable of capturing, storing, and/or providing an image, as described herein. Image capture device 340 may include one or more cameras, one or more sensors (e.g., motion sensors, infrared sensors, temperature sensors, and/or the like), one or more mechanical devices, and/or the like that may be used to capture images of the environment at any desirable angle.

Content provider platform 350 includes one or more devices (e.g., server devices) capable of storing, processing, and/or routing content and/or information associated with content that is to be displayed via electronic display device 330, as described herein. In some implementations, content provider platform 350 may include a communication interface that allows content provider platform 350 to receive information from and/or transmit information (e.g., content) to other devices in environment 300.

Network 360 includes one or more wired and/or wireless networks. For example, network 360 may include a cellular network (e.g., a long-term evolution (LTE) network, a code division multiple access (CDMA) network, a 3G network, a 4G network, a 5G network, another type of next generation network, etc.), a public land mobile network (PLMN), a LAN, a WAN, a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
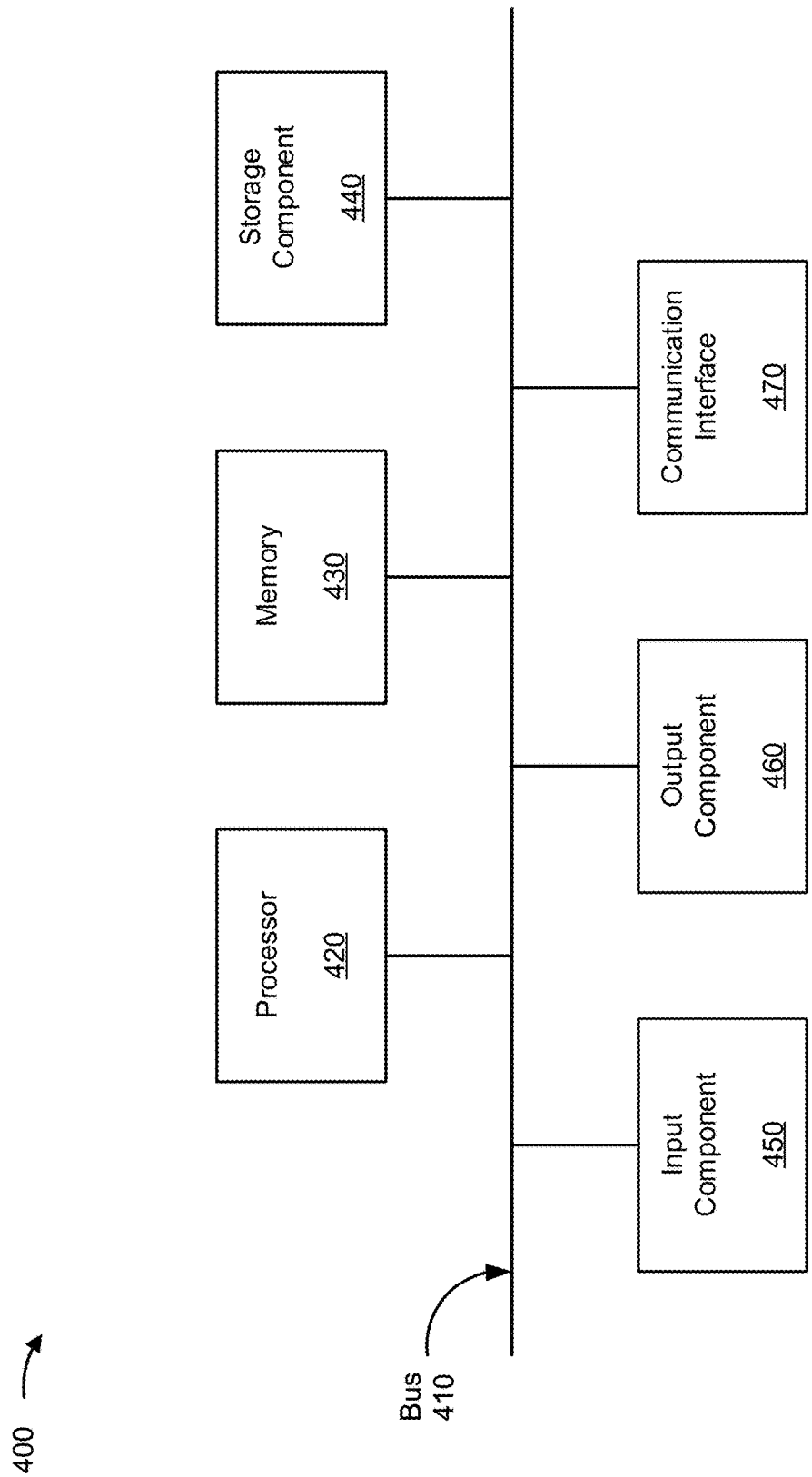
FIG. 4 is a diagram of example components of one or more devices of FIG. 3.

FIG. 4 is a diagram of example components of a device 400. Device 400 may correspond to content control platform 310, computing resource 315 (and/or an edge processing device), electronic display device 330, image capture device 340, and/or content provider platform 350. In some implementations, content control platform 310, computing resource 315, electronic display device 330, image capture device 340, and/or content provider platform 350 may include one or more devices 400 and/or one or more components of device 400. As shown in FIG. 4, device 400 may include a bus 410, a processor 420, a memory 430, a storage component 440, an input component 450, an output component 460, and/or a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like). Output component 460 may correspond to and/or include the electronic display of example implementations 100, 200 and/or an electronic display of electronic display device 330.

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
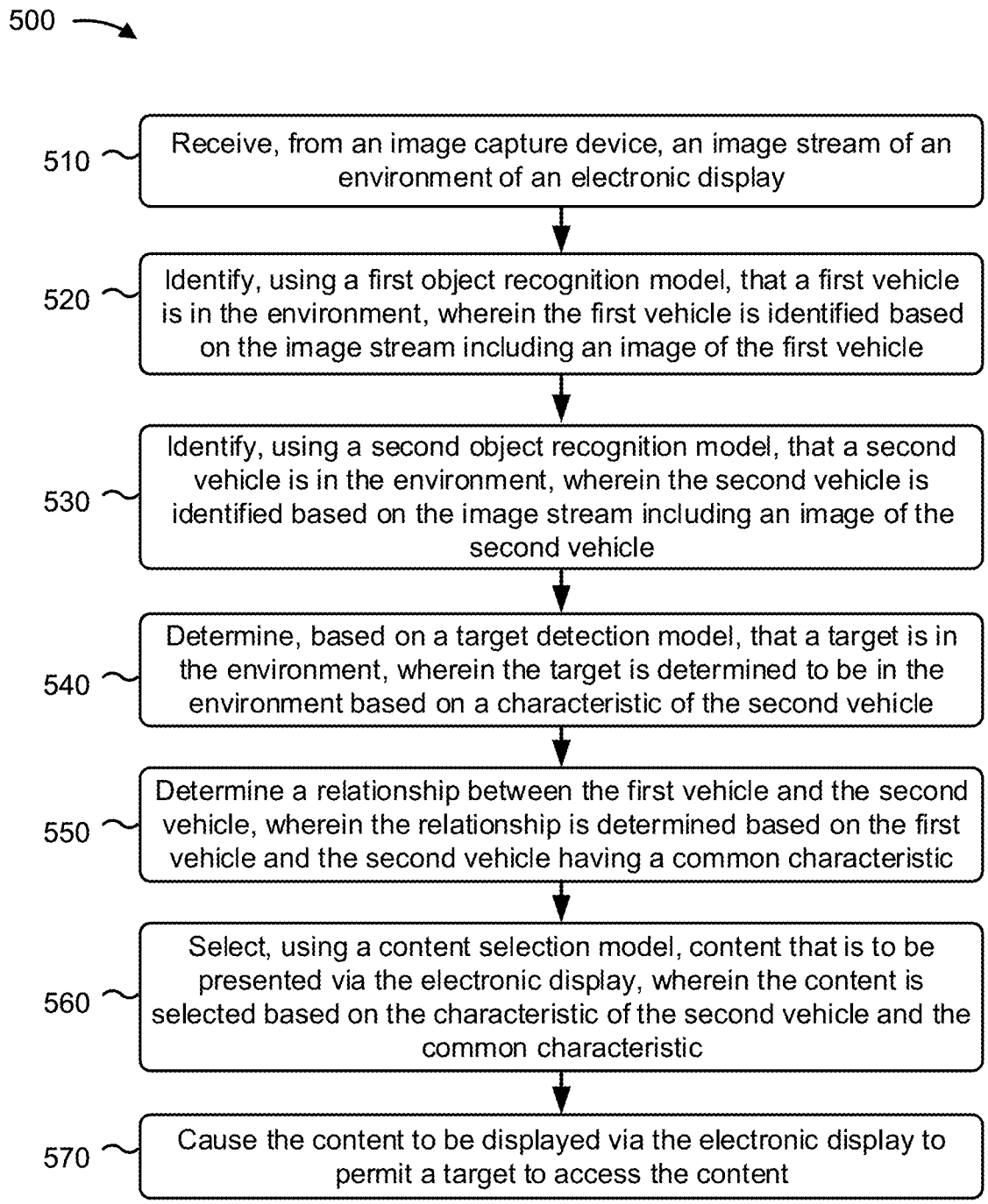
FIGS. 5-7 are a flowcharts of an example process for displaying content on an electronic display based on an environment of the electronic display.

FIG. 5 is a flow chart of an example process 500 for displaying content on an electronic display based on an environment of the electronic display. In some implementations, one or more process blocks of FIG. 5 may be performed by a content control platform (e.g., content control platform 310). In some implementations, one or more process blocks of FIG. 5 may be performed by another device or a group of devices separate from or including a content control platform, such as a computing resource (e.g., computing resource 315, an edge processing device, and/or the like), an electronic display device (e.g., electronic display device 330), an image capture device (e.g., image capture device 340), and a content provider platform (e.g., content provider platform 350).

As shown in FIG. 5, process 500 may include receiving, from an image capture device, an image stream of an environment of an electronic display (block 510). For example, the content control platform may receive, from an image capture device, an image stream of an environment of an electronic display, as described above.

As further shown in FIG. 5, process 500 may include identifying, using a first object recognition model, that a first vehicle is in the environment, wherein the first vehicle is identified based on the image stream including an image of the first vehicle (block 520). For example, the content control platform may identify, using a first object recognition model, that a first vehicle is in the environment, as described above. In some implementations, the first vehicle is identified based on the image stream including an image of the first vehicle.

As further shown in FIG. 5, process 500 may include identifying, using a second object recognition model, that a second vehicle is in the environment, wherein the second vehicle is identified based on the image stream including an image of the second vehicle (block 530). For example, the content control platform may identify, and using a second object recognition model, that a second vehicle is in the environment, as described above. In some implementations, the second vehicle is identified based on the image stream including an image of the second vehicle.

As further shown in FIG. 5, process 500 may include determining, based on a target detection model, that a target is in the environment, wherein the target is determined to be in the environment based on a characteristic of the second vehicle (block 540). For example, the content control platform) may determine, based on a target detection model, that a target is in the environment, as described above. In some implementations, the target is determined to be in the environment based on a characteristic of the second vehicle.

As further shown in FIG. 5, process 500 may include determining a relationship between the first vehicle and the second vehicle, wherein the relationship is determined based on the first vehicle and the second vehicle having a common characteristic (block 550). For example, the content control platform may determine a relationship between the first vehicle and the second vehicle, as described above. In some implementations, the relationship is determined based on the first vehicle and the second vehicle having a common characteristic.

As further shown in FIG. 5, process 500 may include selecting, using a content selection model, content that is to be presented via the electronic display, wherein the content is selected based on the characteristic of the second vehicle and the common characteristic (block 560). For example, the content control platform may select, using a content selection model, content that is to be presented via the electronic display, as described above. In some implementations, the content is selected based on the characteristic of the second vehicle and the common characteristic.

As further shown in FIG. 5, process 500 may include causing the content to be displayed via the electronic display to permit a target to access the content (block 570). For example, the content control platform may cause the content to be displayed via the electronic display to permit a target to access the content, as described above.

Process 500 may include additional implementations, such as any single implementation or any combination of implementations described below and/or in connection with one or more other processes described elsewhere herein.

In a first implementation, the first object recognition model is trained to identify a type of the first vehicle and the second object recognition model is trained to identify a type of the second vehicle. In a second implementation, alone or in combination with one or more of the first implementation, the relationship is determined using a mapping of information identifying characteristics of the first vehicle and information identifying characteristics of the second vehicle and the common characteristic is one of the characteristics of the first vehicle and one of the characteristics of the second vehicle.

In a third implementation, alone or in combination with one or more of the first and second implementations, the content selection model is trained based on characteristics of relationships between one or more vehicles associated with the first vehicle and one or more vehicles associated with the second vehicle. In a fourth implementation, alone or in combination with one or more of the first through third implementations, the first vehicle is a first type of transportation vehicle and the second vehicle is a second type of transportation vehicle that is different from the first type of transportation vehicle.

In a fifth implementation, alone or in combination with one or more of the first through fourth implementations, the second vehicle is identified in the environment based on identifying the first vehicle in the environment. In a sixth implementation, alone or in combination with one or more of the first through fifth implementations, the electronic display is mounted to a stationary support structure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
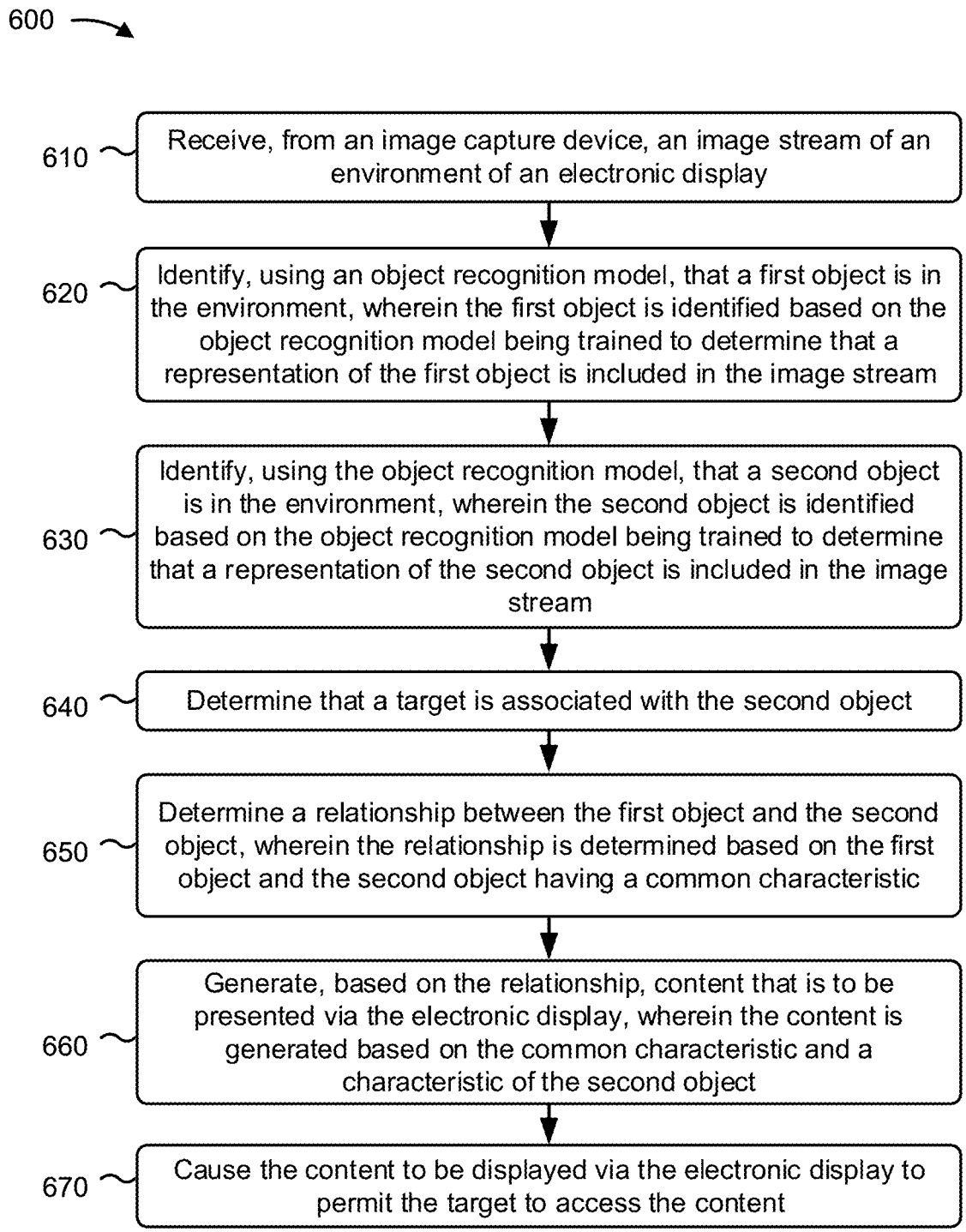

FIG. 6 is a flow chart of an example process 600 for displaying content on an electronic display based on an environment of the electronic display. In some implementations, one or more process blocks of FIG. 6 may be performed by a content control platform (e.g., content control platform 310). In some implementations, one or more process blocks of FIG. 6 may be performed by another device or a group of devices separate from or including a content control platform, such as a computing resource (e.g., computing resource 315, an edge processing device, and/or the like), an electronic display device (e.g., electronic display device 330), an image capture device (e.g., image capture device 340), and a content provider platform (e.g., content provider platform 350).

As shown in FIG. 6, process 600 may include receiving, from an image capture device, an image stream of an environment of an electronic display (block 610). For example, the content control platform may receive, from an image capture device, an image stream of an environment of an electronic display, as described above.

As further shown in FIG. 6, process 600 may include identifying, using an object recognition model, that a first object is in the environment, wherein the first object is identified based on the object recognition model being trained to determine that a representation of the first object is included in the image stream (block 620). For example, the content control platform may identify, using an object recognition model, that a first object is in the environment, as described above. In some implementations, the first object is identified based on the object recognition model being trained to determine that a representation of the first object is included in the image stream.

As further shown in FIG. 6, process 600 may include identifying, using the object recognition model, that a second object is in the environment, wherein the second object is identified based on the object recognition model being trained to determine that a representation of the second object is included in the image stream (block 630). For example, the content control platform may identify, using the object recognition model, that a second object is in the environment, as described above. In some implementations, the second object is identified based on the object recognition model being trained to determine that a representation of the second object is included in the image stream.

As further shown in FIG. 6, process 600 may include determining that a target is associated with the second object (block 640). For example, the edge processing device may determine that a target is associated with the second object, as described above.

As further shown in FIG. 6, process 600 may include determining a relationship between the first object and the second object, wherein the relationship is determined based on the first object and the second object having a common characteristic (block 650). For example, the content control platform may determine a relationship between the first object and the second object, as described above. In some implementations, the relationship is determined based on the first object and the second object having a common characteristic.

As further shown in FIG. 6, process 600 may include generating, based on the relationship, content that is to be presented via the electronic display, wherein the content is generated based on the common characteristic and a characteristic of the second object (block 660). For example, the edge processing device and content control platform may generate, based on the relationship, content that is to be presented via the electronic display, as described above. In some implementations, the content is generated based on the common characteristic and a characteristic of the second object.

As further shown in FIG. 6, process 600 may include causing the content to be displayed via the electronic display to permit the target to access the content (block 670). For example, the content control platform may cause the content to be displayed via the electronic display to permit the target to access the content, as described above.

Process 600 may include additional implementations, such as any single implementation or any combination of implementations described below and/or in connection with one or more other processes described elsewhere herein.

In a first implementation, the first object and the second object are associated with one another based on being a same type of product. In a second implementation, alone or in combination with one or more of the first implementation, the content, when presented via the electronic display, includes information identifying the characteristic of the second object.

In a third implementation, alone or in combination with one or more of the first and second implementations, the content is generated using a content selection model, and the content selection model is a machine learning model that is trained based on historical data associated with previously identified characteristics of other objects associated with the first object and previously identified characteristics of other objects associated with the second object. In a fourth implementation, alone or in combination with one or more of the first through third implementations, the target is determined to be associated with the second object based on the image stream indicating that the second object is moving through the environment, and the second object is determined to be moving through the environment based on different images of the image stream indicating that the second object is in different locations in the environment.

In a fifth implementation, alone or in combination with one or more of the first through fourth implementations, the first object is a vehicle that enables a first type of transportation and the second object is a vehicle that enables a second type of transportation that is different from the first type of transportation. In a sixth implementation, alone or in combination with one or more of the first through fifth implementations, the image capture device is mounted to a structure that supports the electronic display.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
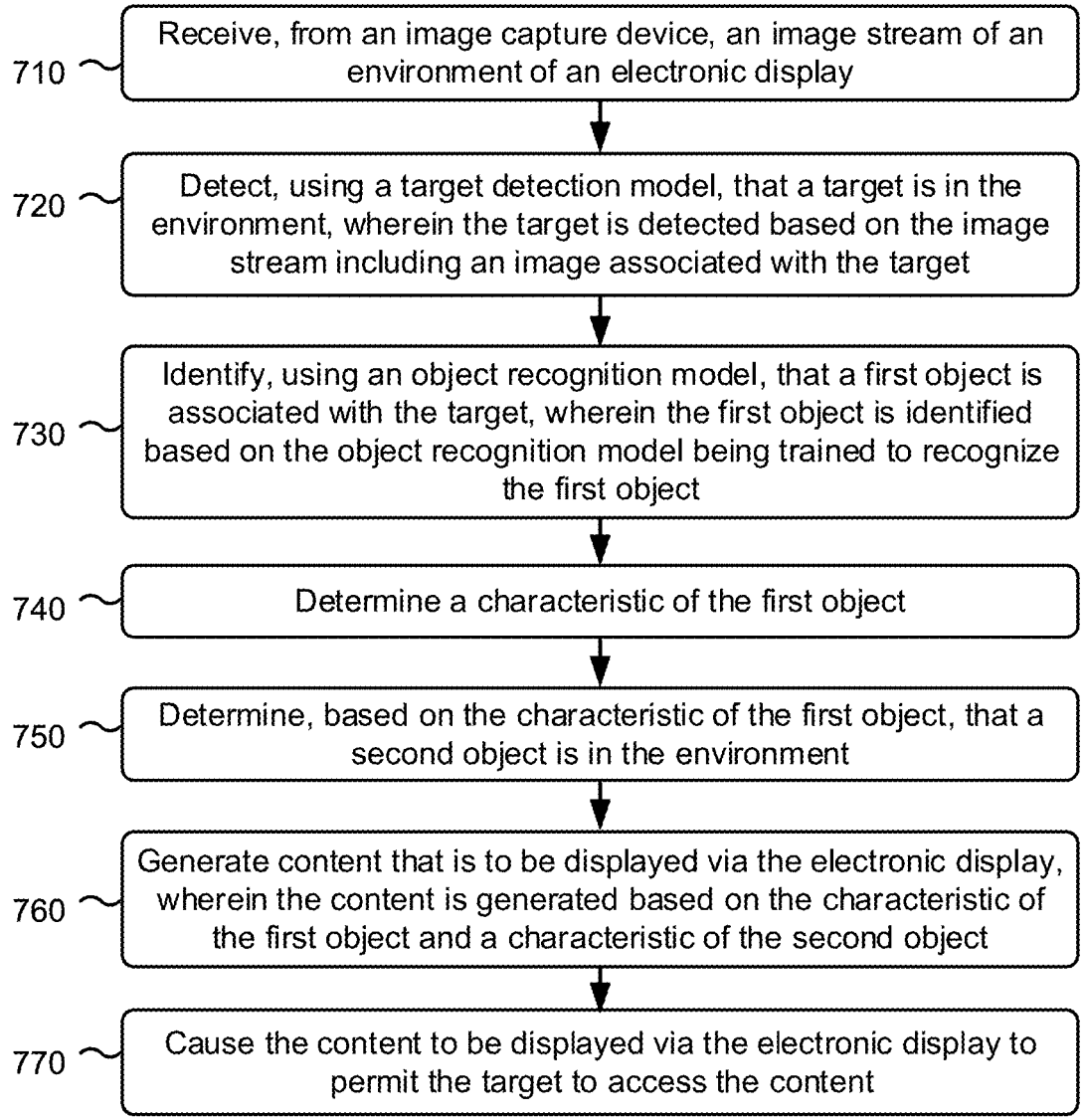

FIG. 7 is a flow chart of an example process 700 for displaying content on an electronic display based on an environment of the electronic display. In some implementations, one or more process blocks of FIG. 7 may be performed by a content control platform (e.g., content control platform 310). In some implementations, one or more process blocks of FIG. 5 may be performed by another device or a group of devices separate from or including a content control platform, such as a computing resource (e.g., computing resource 315, an edge processing device, and/or the like), an electronic display device (e.g., electronic display device 330), an image capture device (e.g., image capture device 340), and a content provider platform (e.g., content provider platform 350).

As shown in FIG. 7, process 700 may include receiving, from an image capture device, an image stream of an environment of an electronic display (block 710). For example, the content control platform may receive, from an image capture device, an image stream of an environment of an electronic display, as described above.

As further shown in FIG. 7, process 700 may include detecting, using a target detection model, that a target is in the environment, wherein the target is detected based on the image stream including an image associated with the target (block 720). For example, the content control platform may detect, using a target detection model, that a target is in the environment, as described above. In some implementations, the target is detected based on the image stream including an image associated with the target.

As further shown in FIG. 7, process 700 may include identifying, using an object recognition model, that a first object is associated with the target wherein the first object is identified based on the object recognition model being trained to recognize the first object (block 730). For example, the content control platform may identify, using an object recognition model, that a first object is associated with the target, as described above. In some implementations, the first object is identified based on the object recognition model being trained to recognize the first object.

As further shown in FIG. 7, process 700 may include determining a characteristic of the first object (block 740). For example, the content control platform may determine a characteristic of the first object, as described above.

As further shown in FIG. 7, process 700 may include determining, based on the characteristic of the first object, that a second object is in the environment (block 750). For example, the content control platform may determine, based on the characteristic of the first object, that a second object is in the environment, as described above.

As further shown in FIG. 7, process 700 may include generating content that is to be displayed via the electronic display, wherein the content is generated based on the characteristic of the first object and a characteristic of the second object (block 760). For example, the content control platform may generate content that is to be displayed via the electronic display, as described above. In some implementations, the content is generated based on the characteristic of the first object and a characteristic of the second object.

As further shown in FIG. 7, process 700 may include causing the content to be displayed via the electronic display to permit the target to access the content (block 770). For example, the content control platform may cause the content to be displayed via the electronic display to permit the target to access the content, as described above.

Process 700 may include additional implementations, such as any single implementation or any combination of implementations described below and/or in connection with one or more other processes described elsewhere herein.

In a first implementation, the second object is determined to be in the environment based on the second object being included in a mapping of a plurality of objects that are associated with the first object. In a second implementation, alone or in combination with the first implementation, the second object is determined, using the object recognition model, to be in the environment based on the second object being one of a plurality of objects that the object recognition model is trained to recognize based on the characteristic of the first object.

In a third implementation, alone or in combination with one or more of the first and second implementations, the target detection model determines that the target is in the environment based on the image associated with the target indicating that the first object moved in the environment. In a fourth implementation, alone or in combination with one or more of the first through third implementations, the target detection model uses an image processing technique that is configured to identify individuals in the environment. In a fifth implementation, alone or in combination with one or more of the first through fourth implementations, the content, when presented via the electronic display, indicates that the second object is in the environment.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
receiving, by a device and from an image capture device, an image stream of an environment of an electronic display;
identifying, by the device and using a first object recognition model, that a first vehicle is in the environment,
wherein the first vehicle is identified based on the image stream including an image of the first vehicle;
identifying, by the device and using a second object recognition model, that a second vehicle is in the environment,
wherein the second vehicle is identified based on the image stream including an image of the second vehicle;
determining, by the device and based on a target detection model, that a target is in the environment,
wherein the target is determined to be in the environment based on a characteristic of the second vehicle;
determining, by the device, a relationship between the first vehicle and the second vehicle,
wherein the relationship is determined based on the first vehicle and the second vehicle having a common characteristic;
selecting, by the device and using a content selection model, content that is to be presented via the electronic display,
wherein the content is selected based on the characteristic of the second vehicle and the common characteristic;
causing, by the device, the content to be displayed via the electronic display to permit a target to access the content,
wherein the content to be displayed includes:
a message to advertise the first vehicle, and
a call to action directed to the target, and
wherein the content is associated with the common characteristic and the second vehicle; and
causing, by the device, different content to be presented via the electronic display when the target is determined to no longer be in the environment.

2. The method of claim 1, wherein the first object recognition model is trained to identify a type of the first vehicle and the second object recognition model is trained to identify a type of the second vehicle.

3. The method of claim 1, wherein the relationship is determined using a mapping of information identifying characteristics of the first vehicle and information identifying characteristics of the second vehicle,
wherein the common characteristic is one of the characteristics of the first vehicle and one of the characteristics of the second vehicle.

4. The method of claim 1, wherein the content selection model is trained based on characteristics of relationships between one or more vehicles associated with the first vehicle and one or more vehicles associated with the second vehicle.

5. The method of claim 1, wherein the first vehicle is a first type of transportation vehicle and the second vehicle is a second type of transportation vehicle that is different from the first type of transportation vehicle.

6. The method of claim 1, wherein the second vehicle is identified in the environment based on identifying the first vehicle in the environment.

7. The method of claim 1, wherein the electronic display is mounted to a stationary support structure.

8. A device, comprising:
one or more memories; and
one or more processors communicatively coupled to the one or more memories, configured to:
receive, from an image capture device, an image stream of an environment of an electronic display;
identify, using an object recognition model, that a first object is in the environment,
wherein the first object is identified based on the object recognition model being trained to determine that a representation of the first object is included in the image stream;
identify, using the object recognition model, that a second object is in the environment,
wherein the second object is identified based on the object recognition model being trained to determine that a representation of the second object is included in the image stream;
determine that a target is associated with the second object;
determine a relationship between the first object and the second object,
wherein the relationship is determined based on the first object and the second object having a common characteristic;
generate, based on the relationship, content that is to be presented via the electronic display,
wherein the content is generated based on the common characteristic and a characteristic of the second object; and
cause the content to be displayed via the electronic display to permit the target to access the content,
wherein the content to be displayed includes:
a message to advertise the first object, and
a call to action directed to the target, and
wherein the content is associated with the common characteristic and the second object; and
cause different content to be displayed via the electronic display when the target is determined to no longer be in the environment.

9. The device of claim 8, wherein the first object and the second object are associated with one another based on being a same type of product.

10. The device of claim 8, wherein the content, when presented via the electronic display, includes information identifying the characteristic of the second object.

11. The device of claim 8, wherein the content is generated using a content selection model,
wherein the content selection model is a machine learning model that is trained based on historical data associated with previously identified characteristics of other objects associated with the first object and previously identified characteristics of other objects associated with the second object.

12. The device of claim 8, wherein the target is determined to be associated with the second object based on the image stream indicating that the second object is moving through the environment,
wherein the second object is determined to be moving through the environment based on different images of the image stream indicating that the second object is in different locations in the environment.

13. The device of claim 8, wherein the first object is a vehicle that enables a first type of transportation and the second object is a vehicle that enables a second type of transportation that is different from the first type of transportation.

14. The device of claim 8, wherein the image capture device is mounted to a structure that supports the electronic display.

15. A non-transitory computer-readable medium storing instructions, the instructions comprising:
  one or more instructions that, when executed by one or more processors, cause the one or more processors to:
    receive, from an image capture device, an image stream of an environment of an electronic display;
    detect, using a target detection model, that a target is in the environment,
      wherein the target is detected based on the image stream including an image associated with the target;
    identify, using an object recognition model, that a first object is associated with the target,
      wherein the first object is identified based on the object recognition model being trained to recognize the first object;
    determine a characteristic of the first object;
    determine, based on the characteristic of the first object, that a second object is in the environment;
    generate content that is to be displayed via the electronic display,
      wherein the content is generated based on the characteristic of the first object and a characteristic of the second object;
    cause the content to be displayed via the electronic display to permit the target to access the content,
      wherein the content to be displayed includes:
        a message to advertise the first object, and
        a call to action directed to the target, and
      wherein the content is associated with the characteristic of the first object, the characteristic of the second object, and the second object; and
    cause different content to be displayed via the electronic display when the target is determined to no longer be in the environment.

16. The non-transitory computer-readable medium of claim 15, wherein the second object is determined to be in the environment based on the second object being included in a mapping of a plurality of objects that are associated with the first object,
  wherein the mapping is associated with the environment.

17. The non-transitory computer-readable medium of claim 15, wherein the second object is determined, using the object recognition model, to be in the environment based on the second object being one of a plurality of objects that the object recognition model is trained to recognize based on the characteristic of the first object.

18. The non-transitory computer-readable medium of claim 15, wherein the target detection model determines that the target is in the environment based on the image associated with the target indicating that the first object moved in the environment.

19. The non-transitory computer-readable medium of claim 15, wherein the target detection model uses an image processing technique that is configured to identify individuals in the environment.

20. The non-transitory computer-readable medium of claim 15, wherein the content, when presented via the electronic display, indicates that the second object is in the environment.

* * * * *